United States Patent
Jones

(10) Patent No.: US 9,851,029 B2
(45) Date of Patent: Dec. 26, 2017

(54) SEISMIC CONDUIT JOINT CONNECTOR

(71) Applicant: Revelation Connection Technologies, LLC, Los Angeles, CA (US)

(72) Inventor: Jim Jones, Aledo, TX (US)

(73) Assignee: REVELATION CONNECTION TECHNOLOGIES, LLC, Los Angeles, CA (US)

(*) Notice: Subject to any disclaimer, the term of this patent is extended or adjusted under 35 U.S.C. 154(b) by 309 days.

(21) Appl. No.: 14/420,855

(22) PCT Filed: Sep. 26, 2013

(86) PCT No.: PCT/US2013/061806
§ 371 (c)(1),
(2) Date: Feb. 10, 2015

(87) PCT Pub. No.: WO2014/052521
PCT Pub. Date: Apr. 3, 2014

(65) Prior Publication Data
US 2015/0204468 A1  Jul. 23, 2015

Related U.S. Application Data

(60) Provisional application No. 61/705,811, filed on Sep. 26, 2012.

(51) Int. Cl.
*F16L 21/02* (2006.01)
*F16L 17/035* (2006.01)
(Continued)

(52) U.S. Cl.
CPC ......... *F16L 17/035* (2013.01); *F16L 27/1017* (2013.01); *F16L 27/1021* (2013.01); *F16L 37/0845* (2013.01)

(58) Field of Classification Search
CPC ..................................................... F16L 17/035
(Continued)

(56) References Cited

U.S. PATENT DOCUMENTS 3,724,880 A * 4/1973 Seiler .................... F16L 17/035
285/105
4,229,026 A   10/1980 Seiler
(Continued)

FOREIGN PATENT DOCUMENTS

WO        95/08072 A1    3/1995
WO     2008/143743 A1   11/2008

OTHER PUBLICATIONS

International Search Report and Written Opinion issued in corresponding PCT Application No. PCT/US2013/061806, dated Jan. 10, 2014, 11 pages.

*Primary Examiner* — Aaron Dunwoody
(74) *Attorney, Agent, or Firm* — Duane Morris LLP

(57) ABSTRACT

A system includes a conduit and a gasket assembly. The conduit includes a body and has a bell defining an opening disposed at one end of the conduit. The bell includes a ridge defining a circumferential internal groove, a sloping portion defining an internal recessed area and disposed adjacent to the ridge, and an abutment end inwardly extending from the sloping portion in a direction that is perpendicular to a central axis defined by the bell. The gasket assembly is disposed within the internal groove. The gasket assembly includes a plurality of gripping inserts each comprising a hollow body and an elastomeric gasket having a circular shape and being disposed within the hollow bodies defines by the plurality of gripping inserts.

20 Claims, 12 Drawing Sheets

(51) Int. Cl.
*F16L 27/10* (2006.01)
*F16L 37/084* (2006.01)

(58) Field of Classification Search
USPC .............. 285/374, 345, 339; 277/609, 611
See application file for complete search history.

(56) References Cited

U.S. PATENT DOCUMENTS

| | | |
|---|---|---|
| 4,871,197 A | 10/1989 | Codding, III |
| 5,067,751 A | 11/1991 | Walworth et al. |
| 5,269,569 A | 12/1993 | Weber et al. |
| 5,295,697 A | 3/1994 | Weber et al. |
| 5,464,228 A | 11/1995 | Weber et al. |
| 6,488,319 B2 | 12/2002 | Jones |
| 6,502,867 B2 | 1/2003 | Holmes, IV et al. |
| 6,688,652 B2 | 2/2004 | Holmes, IV et al. |
| 6,945,570 B2 | 9/2005 | Jones |
| 6,974,160 B2 | 12/2005 | Jones |
| D514,671 S | 2/2006 | Jones |
| 7,125,054 B2 | 10/2006 | Jones |
| 7,134,204 B2 | 11/2006 | Corbett, Jr. et al. |
| 7,284,310 B2 | 10/2007 | Jones et al. |
| 7,328,493 B2 | 2/2008 | Jones et al. |
| 7,410,174 B2 | 8/2008 | Jones et al. |
| 7,537,248 B2 | 5/2009 | Jones et al. |
| 7,618,071 B2 | 11/2009 | Jones et al. |
| 7,815,225 B2 | 10/2010 | Jones et al. |
| 2010/0244442 A1 | 9/2010 | Jones et al. |
| 2011/0084478 A1 | 4/2011 | Holmes, IV et al. |
| 2011/0209775 A1 | 9/2011 | Holmes, IV et al. |
| 2011/0285093 A1 | 11/2011 | Holmes, IV et al. |
| 2012/0038116 A1 | 2/2012 | Holmes, IV et al. |
| 2012/0049463 A1 | 3/2012 | Holmes, IV et al. |
| 2012/0227240 A1 | 9/2012 | Holmes, IV et al. |
| 2012/0228836 A1 | 9/2012 | Holmes, IV et al. |
| 2012/0280497 A1 | 11/2012 | Holmes, IV et al. |

* cited by examiner

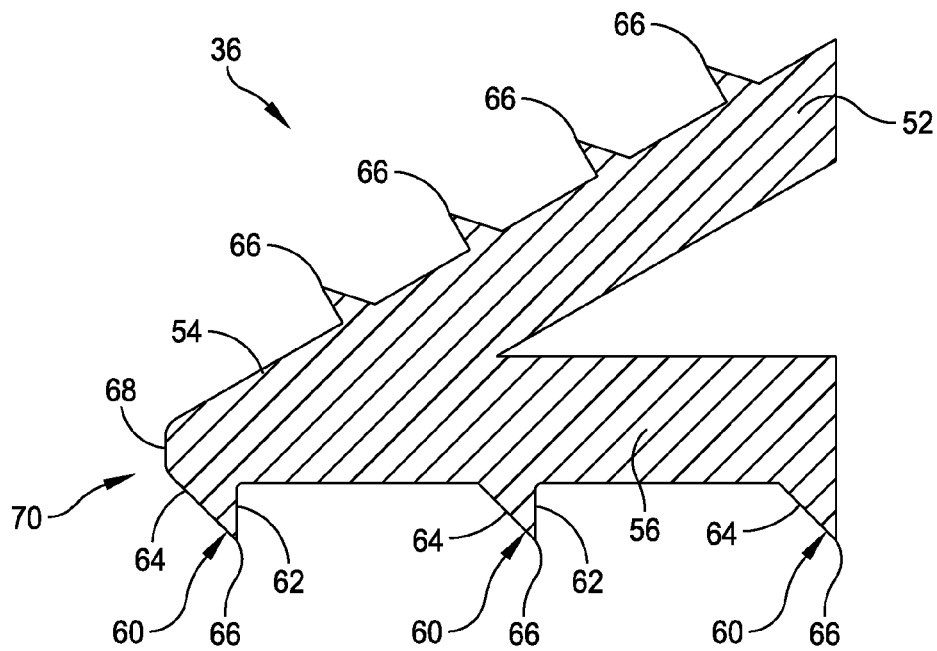
FIG. 12
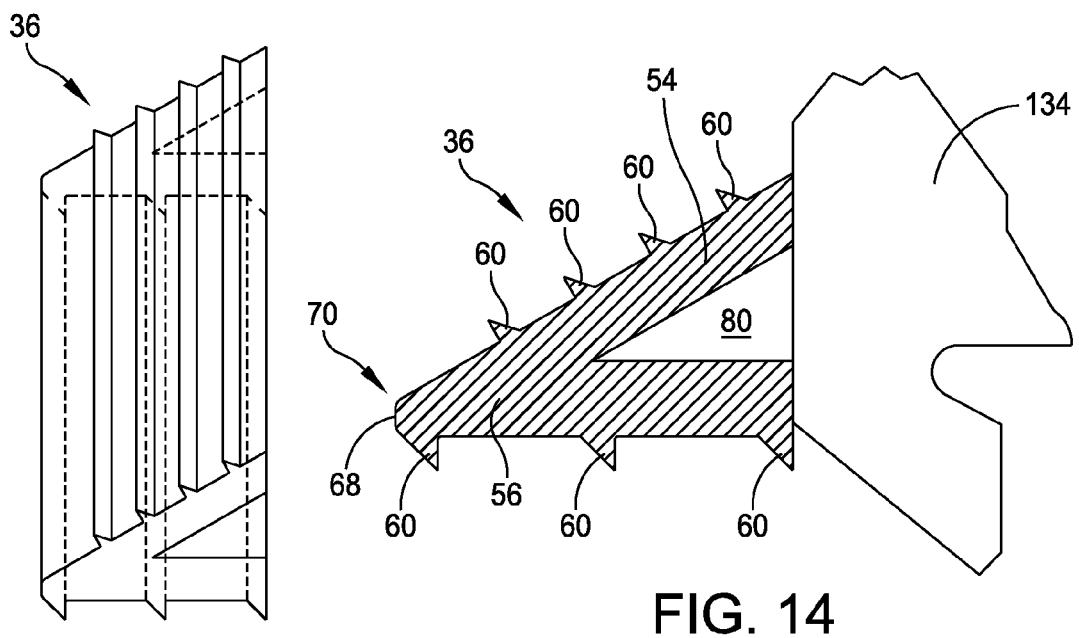
FIG. 13
FIG. 14

SEISMIC CONDUIT JOINT CONNECTOR

CROSS-REFERENCE TO RELATED APPLICATIONS

This application is a national phase entry under 35 U.S.C. §371 of international patent application PCT/US2013/061806, and claims priority to U.S. Provisional Patent Application No. 61/705,811, filed Sep. 26, 2012, the entireties of which are herein incorporated by reference.

FIELD OF DISCLOSURE

The disclosed system and method relate to pipe joints and fittings. More particularly, the disclosed system and method relate to a pipe connection that enables both the pipe and fitting joints to deflect relative to one another.

BACKGROUND

Polyvinyl chloride ("PVC") pipes are frequently used in buried applications for carrying water and waste water and are typically buried between 2 and 4 feet beneath the surface, although such pipes may also be buried between 15 and 20 feet beneath the surface. In buried applications, ground movement is usually minor especially in areas with minimal seismic activity. However, ground movement can be extreme in areas experiencing frequent and violent seismic activity as well as areas that experience dramatic expansion and contraction, e.g., coastal areas and areas in which the ground is predominantly clay or soils described as expansive.

There are two things can happen when there is ground movement. One is joint separation, and the second is pipe shear and ultimate failure. There are multiple products on the market today called joint restraint. These products are assembled externally by mechanical means over the pipe bells eliminating joint separation. However, once assembled these products do not allow for deflection so problems still exist with pipe shearing and failures when there is ground movement.

SUMMARY

In some embodiments, a system includes a conduit and a gasket assembly. The conduit includes a body and has a bell defining an opening disposed at one end of the conduit. The bell includes a ridge defining a circumferential internal groove, a sloping portion defining an internal recessed area and disposed adjacent to the ridge, and an abutment end inwardly extending from the sloping portion in a direction that is perpendicular to a central axis defined by the bell. The gasket assembly is disposed within the internal groove. The gasket assembly includes a plurality of gripping inserts each comprising a hollow body and an elastomeric gasket having a circular shape and being disposed within the hollow bodies defines by the plurality of gripping inserts.

In some embodiments, a system includes a conduit and a gasket assembly. The conduit includes a body and a bell defining an opening disposed at one end of the conduit. The bell includes a ridge defining a circumferential internal groove, a sloping portion defining an internal recessed area and disposed adjacent to the ridge, and an abutment end inwardly extending from the sloping portion in a direction that is perpendicular to a central axis defined by the bell. The gasket assembly is sized and configured to be received within the internal groove defined by the bell of the conduit. The gasket assembly includes a plurality of gripping inserts each comprising a hollow body and an elastomeric gasket having a circular shape and being disposed within the hollow bodies defines by the plurality of gripping inserts.

In some embodiments, a system includes a first conduit, a second conduit, and a gasket assembly. The first conduit includes a spigot end. The second conduit includes an elongate body and a bell defining an opening disposed at one end of the second conduit. The bell includes a ridge defining a circumferential internal groove, a sloping portion defining an internal recessed area and disposed adjacent to the ridge, and an abutment end inwardly extending from the sloping portion in a direction that is perpendicular to a central axis defined by the bell. The gasket assembly is disposed within the internal groove. The gasket assembly includes a plurality of gripping inserts each comprising a lower wall from which a plurality of teeth extend to contact the spigot end of the first conduit, a rear wall, and an upper wall that defines an internal cavity with the lower and rear walls. An elastomeric gasket has a circular shape and is at least partially disposed within the internal cavities of the plurality of gripping inserts. The gasket assembly secures the spigot end of the first conduit within the bell of the second conduit.

BRIEF DESCRIPTION OF THE DRAWINGS

FIG. 12 is a cross-sectional view of a gripping insert in accordance with some embodiments taken along line 12-12 in FIG. 11.

FIG. 13 is a front-side plan view of the gripping insert illustrated in FIG. 10 in accordance with some embodiments.

FIG. 14 is a cross-sectional view of a gripping insert in accordance with FIG. 10 coupled to a gasket in accordance with some embodiments.

DETAILED DESCRIPTION

Figure 1:
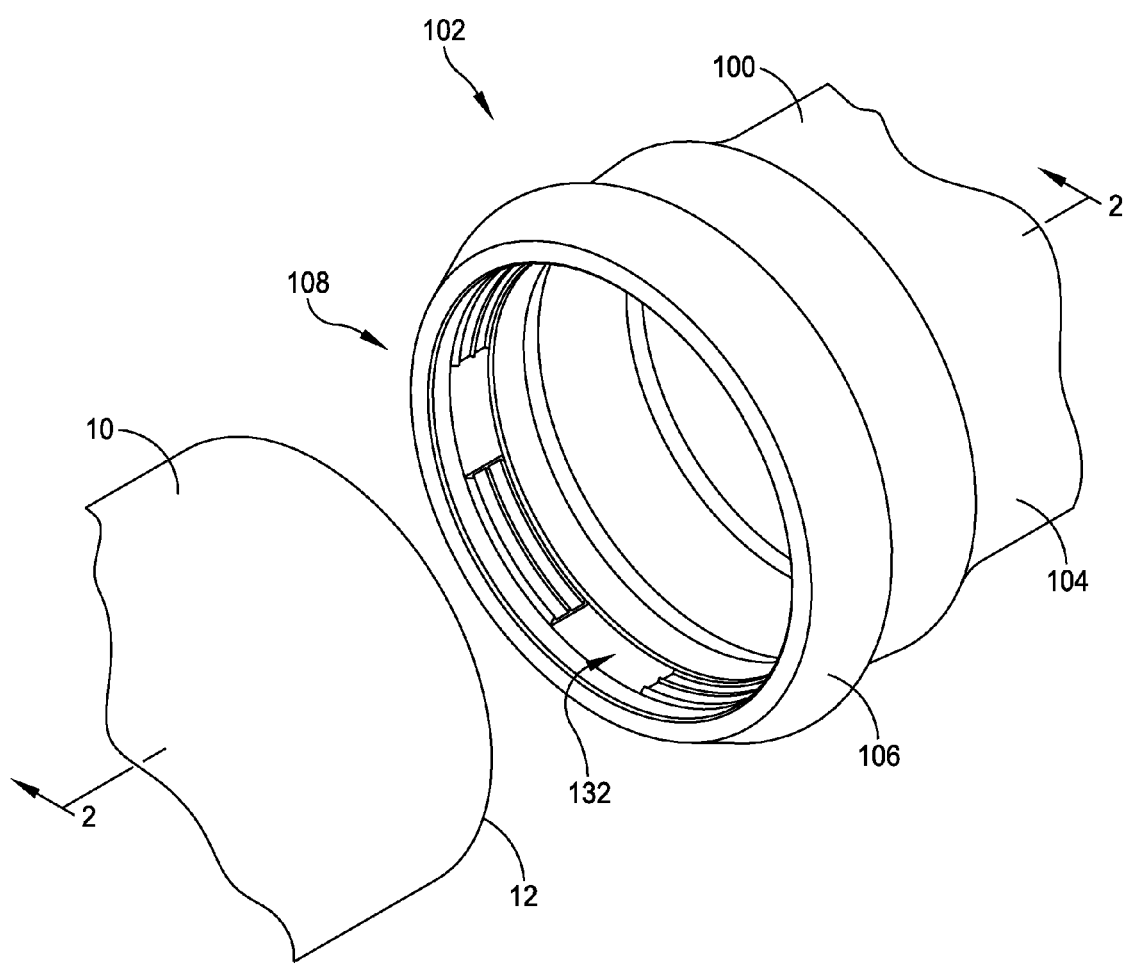
FIG. 1 is an isometric view of a pair of conduits to be connected together in accordance with some embodiments.

This description is intended to be read in connection with the accompanying drawings, which are to be considered part of the entire written description. The drawing figures are not necessarily to scale and certain features may be shown exaggerated in scale or in somewhat schematic form in the interest of clarity and conciseness.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. When only a single machine is illustrated, the term "machine" shall also be taken to include any collection of machines that individually or jointly execute a set (or multiple sets) of instructions to perform any one or more of the methodologies discussed herein. The term "operatively connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

The disclosed systems and methods for connecting conduits, e.g., pipes and/or fittings, advantageously provides a pipe joint or a fitting joint that permits deflection up to and beyond five degrees in a single direction and up to and exceeding ten degrees in multiple directions. Furthermore, the system can be used with polyvinyl chloride ("PVC") pipes thereby enabling PVC pipes to be used in coastal areas, areas susceptible to frequent and extreme seismic activity, and areas susceptible to significant soil expansion and contraction, e.g., clay soil areas. The disclosed system can also be used in horizontal directional drilling operations as the system actuates in fluid and dry applications as described in greater detail below.

FIG. 1 illustrates a pair of conduits 10, 100, such as a pipe or fitting, that are to be connected using the novel system disclosed herein. In some embodiments, conduits 10 and 100 are fabricated from PVC, although conduits 10, 100 may be fabricated from other materials including, but not limited to, polyethylene, polypropylene, or a ferrous metal. Examples of ferrous metals include, for example, ductile iron. Conduit 10 includes a male or spigot end 12 that is to be received within female bell end 102 of conduit 100. Bell 102 is outwardly flared from the remaining length 104 of conduit 100 and includes a circumferential ridge 106 that is disposed along the length of bell 102. Ridge 106 is disposed adjacent to open end 108 of conduit 100. As will be understood by one of ordinary skill in the art, the internal diameter of bell 102 is greater than an external diameter of spigot end 12 of conduit 10.

Figure 2:
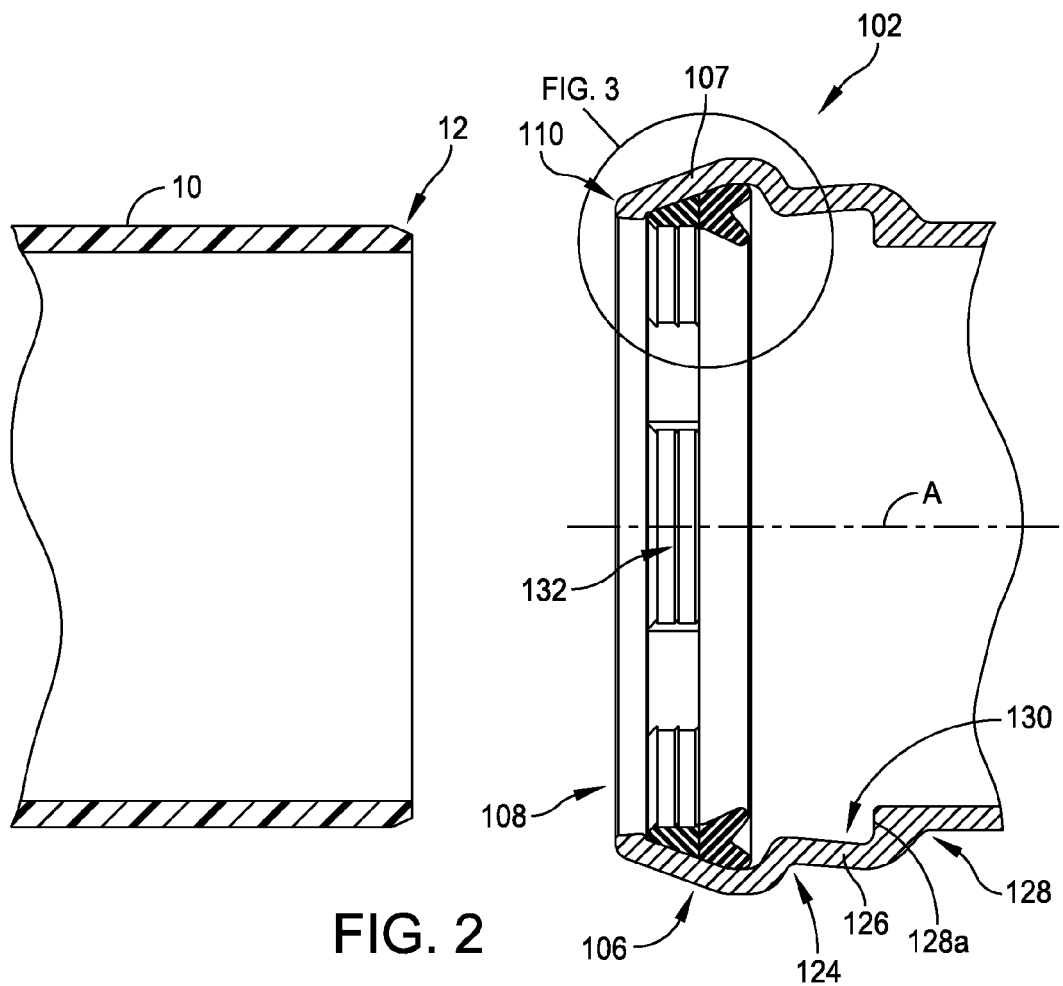
FIG. 2 is a cross-sectional view of the conduits illustrated in FIG. 1.

As best seen in FIG. 2, which is a cross-sectional view of bell 102 in which gasket assembly 132 is disposed, the outer lip 110 of open end is tapered with respect to a central axis, A, defined by conduit 100. For example, outer lip 110 is tapered such that the outer edge 112 has a greater diameter than inner edge 114. In some embodiments, the taper of outer lip 110 is five degrees with respect to the central axis, A, defined by bell 102 of conduit 100; however, one of ordinary skill in the art will understand that the taper of outer lip 110 may be greater or less than five degrees. For example, the taper on outer lip can be within the range of one to ten degrees.

Figure 3:
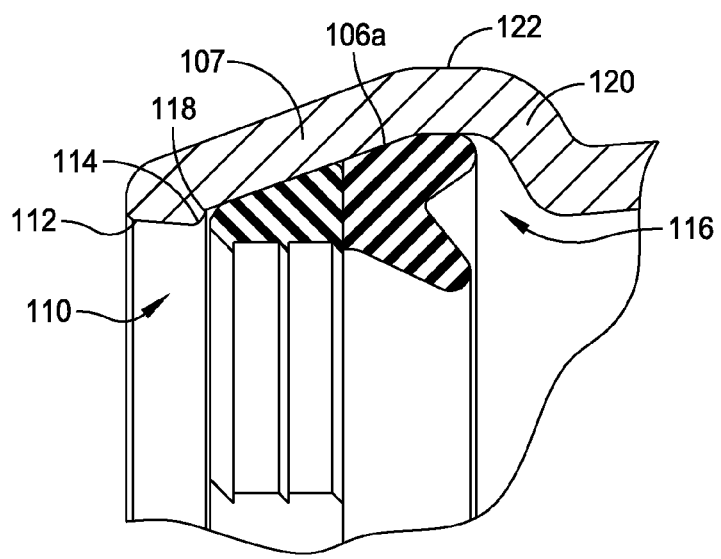
FIG. 3 is a detail view of the bell and gasket assembly illustrated in FIG. 2.
Figure 4:
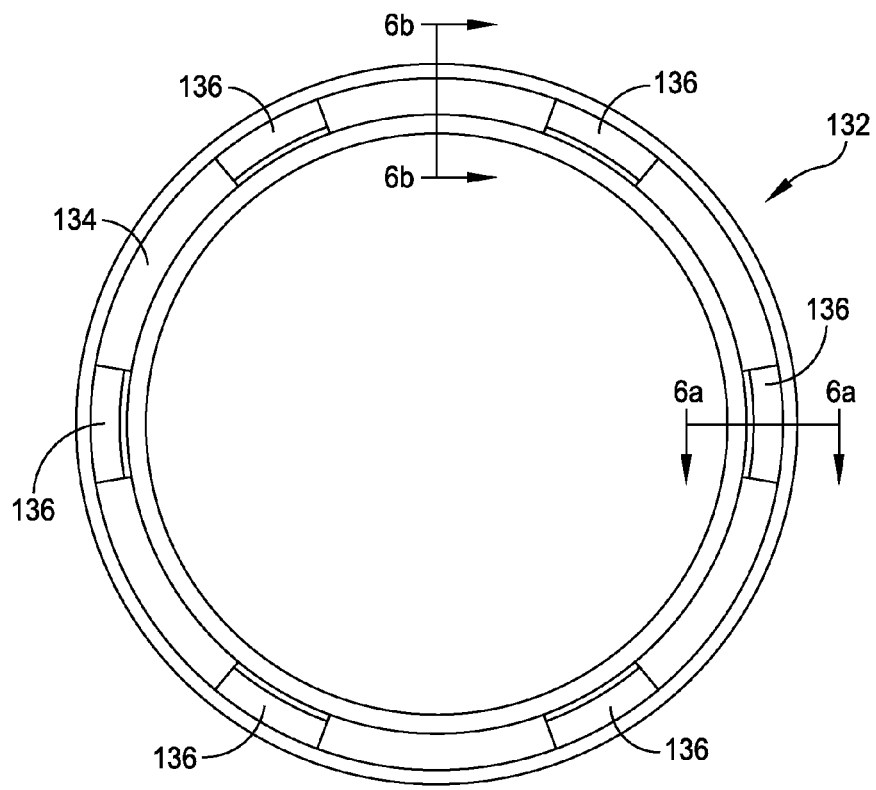
FIG. 4 is a plan view of one example of a gasket assembly in accordance with some embodiments.
Figure 5:
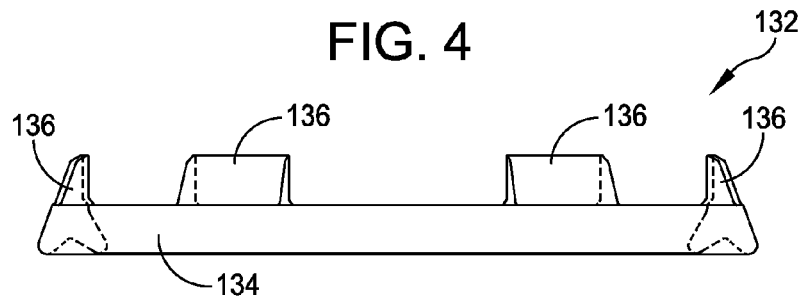
FIG. 5 is a side view of the gasket assembly illustrated in FIG. 4.

Referring to FIGS. 2 and 3, ridge 106 includes a forward portion 107 that angles radially away from inner edge 114 of outer lip 110 and also includes a rear portion 120 that defines an internal groove 116 in combination with forward portion 107 that is sized and configured to receive gasket assembly 132, which is described in greater detail below. In some embodiments, forward portion 107 of ridge 106 extends away from outer lip 110 at an angle of approximately 20 degrees with respect to the central axis, A, defined by bell 102 of conduit 100. One of ordinary skill in the art will understand that forward portion 107 of ridge 106 may angle away from outer lip 110 at angles greater than or less than 20 degrees. In some embodiments, for example, the range of angles is between 15 and 20 degrees, and more preferably between 16 and 18 degrees. As best seen in FIG. 3, a small notch 118 is defined at the interface between inner edge 114 of outer lip 110 and internal surface 106a of ridge 106. Notch 118 functions to act as a stop for gasket assembly 132 as described in greater detail below.

Rear portion 120 of ridge 106 angles away from the apex 122 of ridge where it terminates at valley 124, which is disposed between ridge 106 and sloping portion 126 of bell 102 that angles away from valley 124 until it terminates at abutment end 128 of bell 102. Sloping portion 126 in combination with valley 124 and abutment end 128, defines a recessed area 130 that enables relative movement between pipes 10 and 100 as described in greater detail below. Internal surface 128a of abutment end 128 inwardly extends from sloping portion 126 such that internal surface 128a is approximately perpendicular to central axis, A, defined by pipe 100.

Gasket assembly 132 is now described with reference to FIGS. 4-19. Referring first to FIGS. 4-6B, gasket assembly 132 includes a gasket 134 with a plurality of integrally formed gripping inserts 136. Gasket 134 has a circular shape defining a ring. As will be understood by one of ordinary skill in the art, gasket 134 is formed from an elastomeric material such as, for example, styrene-butadiene rubber ("SBR"), an ethylene-propylene-diene monomer ("EDPM") rubber, nitrile rubber, plastic or other suitable material and combinations therefor. For example, gasket 132 can be formed of rubber having two different durometers as described in greater detail below. In some embodiments that are described in greater detail below, gasket 132 is a composite of rubber and plastic materials.

Figures 6A, 6B:
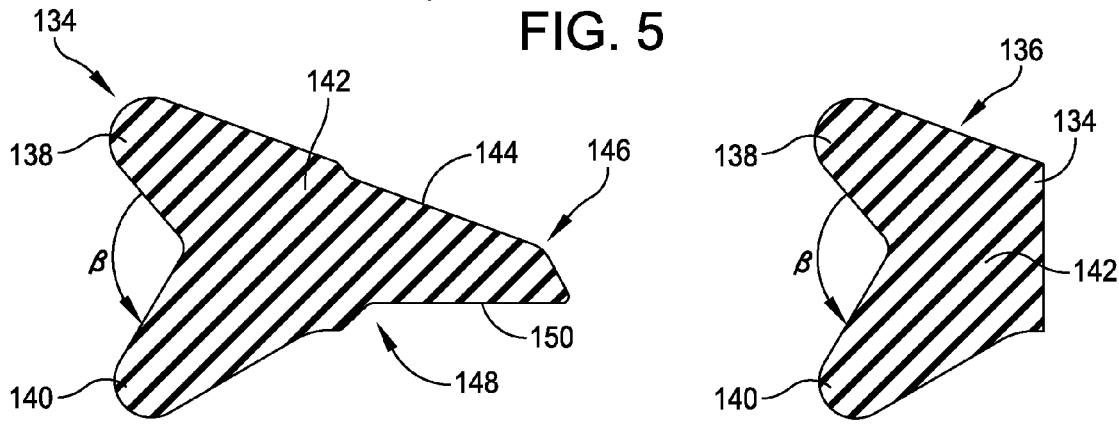
FIG. 6A is a cross-sectional view of the gasket taken along line 6A-6A in FIG. 5.
FIG. 6B is a cross-sectional view of the gasket taken along line 6B-6B in FIG. 5.

As best seen in FIGS. 6A and 6B, trailing end 136 of gasket 134 includes a pair of divergent legs 138, 140 extending from body 142. In some embodiments, the angle β between divergent legs 138, 140 is approximately 110 degrees. In some embodiments, the angle β between divergent legs 138, 140 is greater than or less than 110 degrees. Upper surface 144 of body 142 tapers towards front end 146, and bottom surface 148 provides a flat 150 along a portion of its length.

Figure 7:
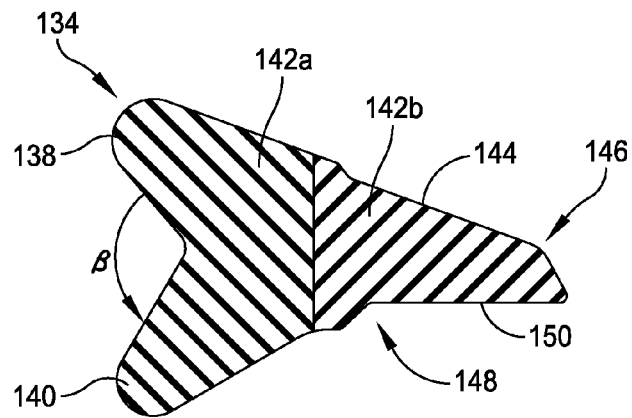
FIG. 7 is a cross-sectional view of a two-material gasket in accordance with some embodiments.

FIG. 7 illustrates an embodiment in which body 142 of gasket 134 includes a first portion 142a and a second portion 142b. In some embodiments, portions 142a and 142b are both formed from rubber, but the durometer of portion 142a is less than the durometer of portion 142b such that portion 142a forms a sealing portion and portion 142b forms a rigid gripping portion. In some embodiments, portion 142a is formed from rubber and portion 142 is formed from a plastic or other material.

Figure 8:
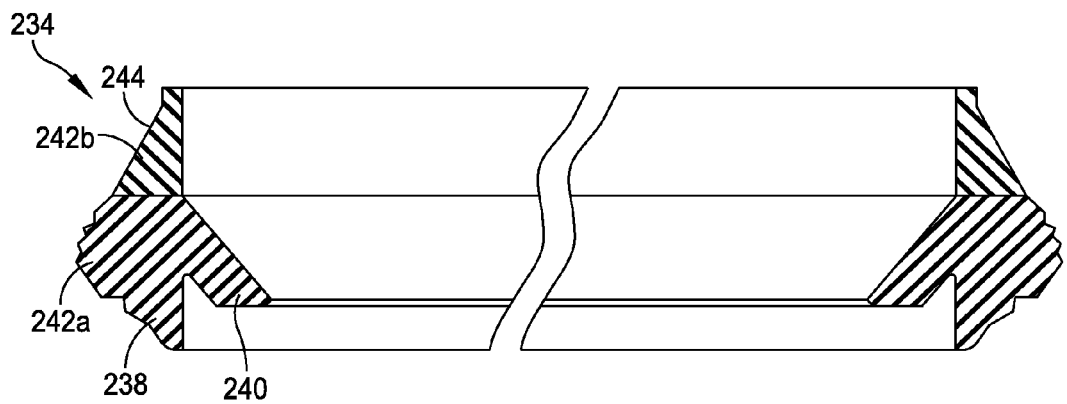
FIG. 8 is a cross-sectional view of another example of a two-material gasket in accordance with some embodiments.
Figure 9:
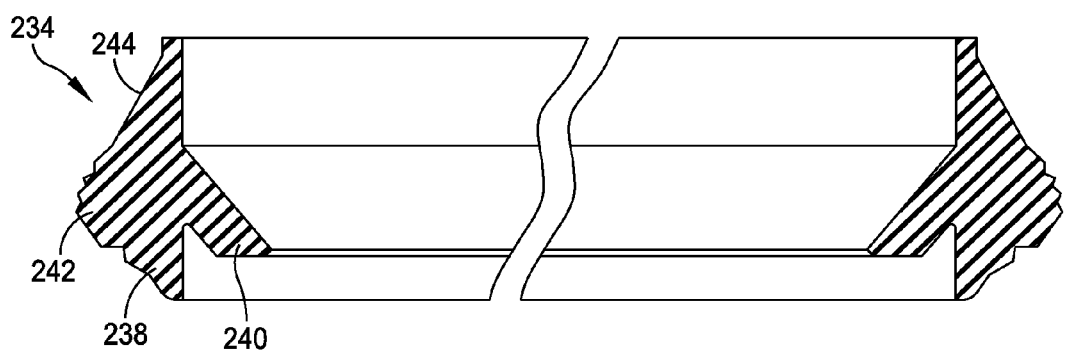
FIG. 9 is a cross-sectional view of a gasket in accordance with some embodiments.
Figure 10:
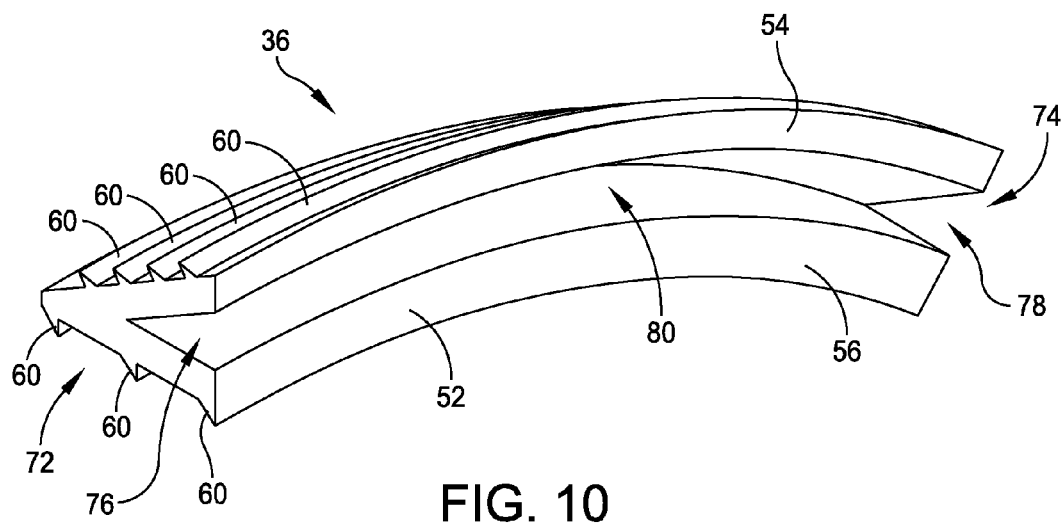
FIG. 10 is a bottom-side isometric view of one example of a gripping insert in accordance with some embodiments.
Figure 11:
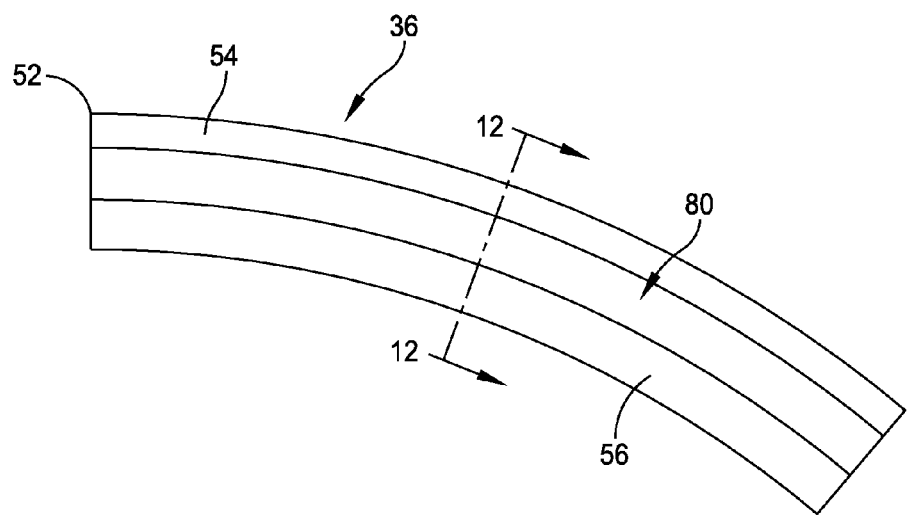
FIG. 11 is a bottom-side plan view of the gripping insert illustrated in FIG. 10 in accordance with some embodiments.

The gasket may have other shapes such as the shape illustrated in FIGS. 8 and 9. As shown in FIGS. 8 and 9, gasket 234 includes a pair of divergent legs 238 and 240 and a body 242. Upper forward surface 244 angles towards the front of gasket 234. In the embodiment illustrated in FIG. 8, gasket 234 includes first and second portions 242a, 242b. In some embodiments, portion 242a is formed from rubber having a first durometer and portion 242b is formed from rubber having a second durometer that is greater than the first durometer. In some embodiments, portion 242a is formed from rubber and portion 242b is formed from a plastic or other rigid material. In the embodiment illustrated in FIG. 9, gasket 234 is formed from a single material.

FIGS. 10-14 provide various views of one example one of the plurality of gripping inserts 36, which includes a body 52 that curves along its length. The curvature of body 52 is complementary to the curvature of spigot end 12 of pipe 10. As best seen in FIG. 12, which is a sectional view of gripping insert 36 taken along line 12-12 in FIG. 11, body 52 has a triangular cross-sectional shape as defined by upper wall 54 and lower wall 56. Upper wall 54 and lower wall 56 diverge from one another at a non-perpendicular angle in some embodiments. For example, in some embodiments, the angle between walls 54 and 56 is complementary to the angle at which ridge angles away from the central axis, A, defined by bell 102 of pipe 100.

One or more teeth 60 extend from upper wall 54 and lower wall 56 and are configured to bite into the outer surface of male pipe 10 to prevent separate of pipe 10 and pipe 100 once pipes 10, 100 are engaged with one another. In some embodiments, such as the embodiment illustrated in FIGS. 12 and 14, teeth 60 extend parallel to one another along the length of gripping insert 36. In some embodiments, teeth 60 have a different configuration such as, for example, an interrupted configuration in which teeth 60 do not extend the entire length of body 52 or have a non-parallel configuration.

Each tooth 60 includes a rear surface 62 that is approximately orthogonal to lower wall 56 and a forward surface 64 that extends towards lower wall 56 at a non-orthogonal angle such that a point 66 is formed between rear surface 62 and forward surface 64. In some embodiments, the angle between rear surface 62 and forward surface 64 is 45 degrees; however, one of ordinary skill in the art will understand that the angle between rear surface 62 and forward surface 64 can be greater or less than 45 degrees. The length of rear surface 62, i.e., the height of a tooth 60, may be varied. In some embodiments, for example, the teeth 60 of a gripping insert 36 used with a high-density polyethylene ("HDPE") pipe is longer than the teeth 60 of a gripping insert 36 used with an IPS pipe.

In some embodiments, such as the embodiment illustrated in FIGS. 12 and 14, the forward surface 164 of the foremost tooth 60 is extended to the foremost tip 68 of gripping insert 36 such that the leading end 70 of gripping insert 36 includes an angled surface. Gripping insert 36 is hollow with opposed sides 72, 74 defining respective openings 76, 78 that communicate with channel 80.

In some embodiments, gripping inserts 36 are formed from a rigid metal, such as steel, by an investment casting process. In some embodiments, gripping inserts 36 are formed from another material such as, for example, a plastic, such as an engineered plastic, or a ceramic material. Gripping inserts 36 are joined to gasket 134 by injection molding the gasket material into a mold in which gripping inserts 36 are disposed.

The hollow structure of gripping inserts 36 advantageously enables gripping inserts 36 to be integrally formed with gasket 134 without the use of primers or adhesives as the injection molded gasket material flows through openings 76, 78 and within channel 80 to secure gripping inserts 36 to gasket 134. The resultant structure of gasket assembly 132 prevents gasket 134 from blowing out when subjected to high pressures (e.g., pressures at or around 755 psi) when fully deflected. Additionally, the hollow design of gripping inserts 136 reduces the overall weight of gasket assembly 132.

Figure 15:
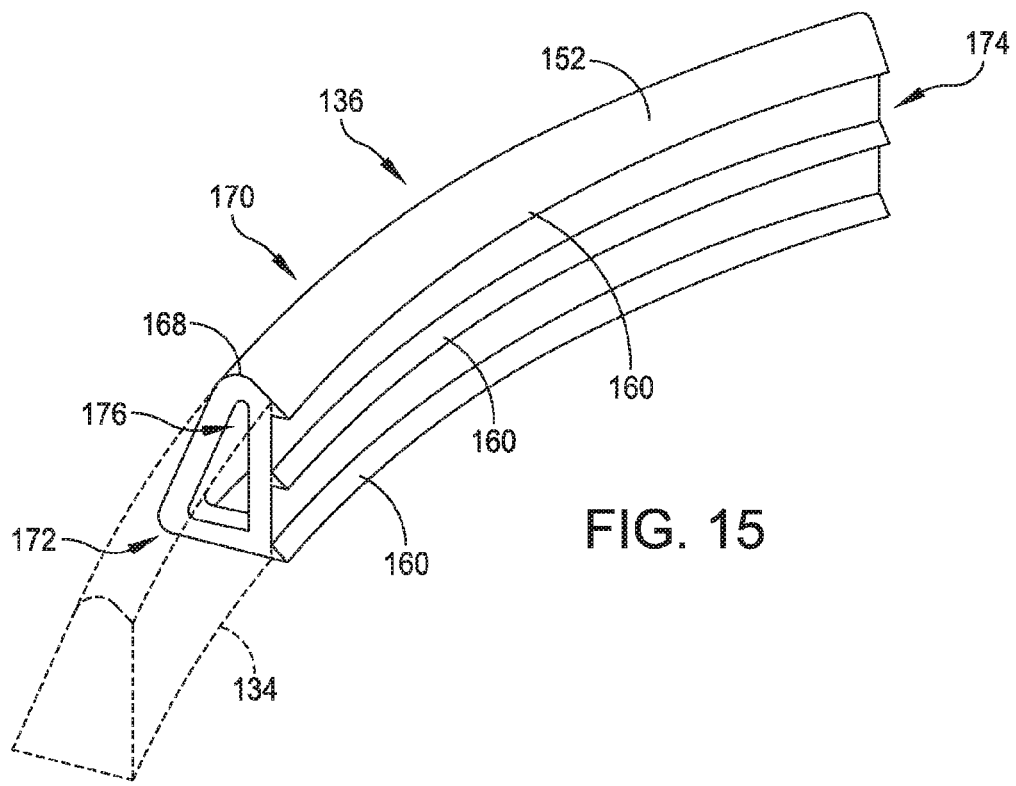
FIG. 15 is a bottom-side isometric view of another example of a gripping insert in accordance with some embodiments.
Figure 16:
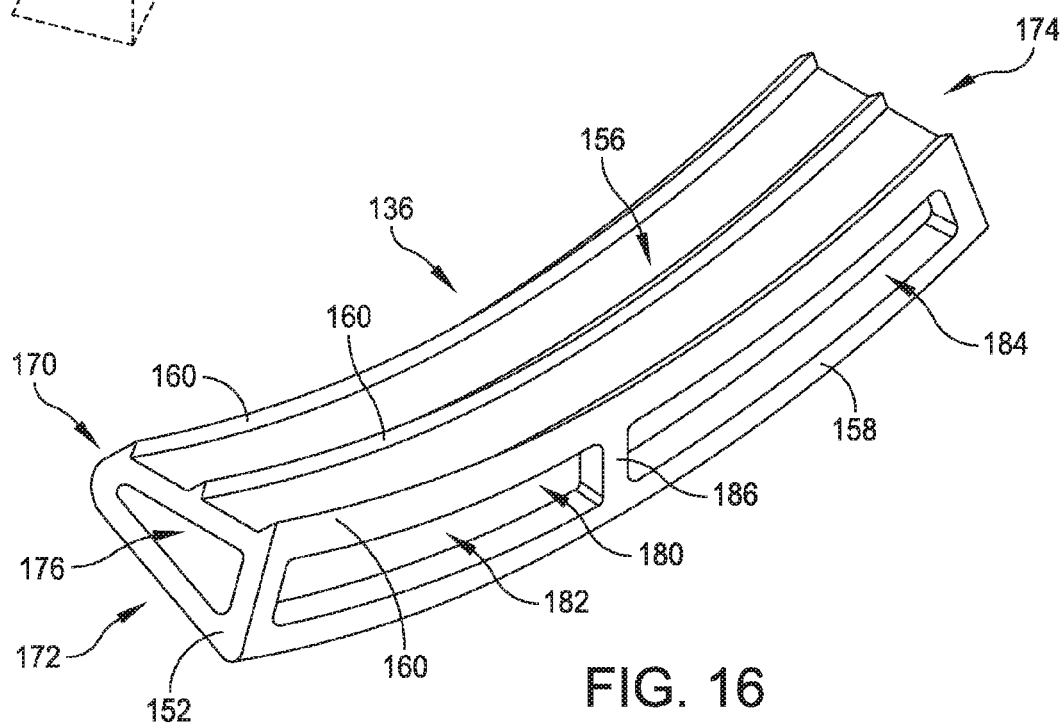
FIG. 16 is a rear-side isometric view of the gripping insert illustrated in FIG. 15.
Figure 17:
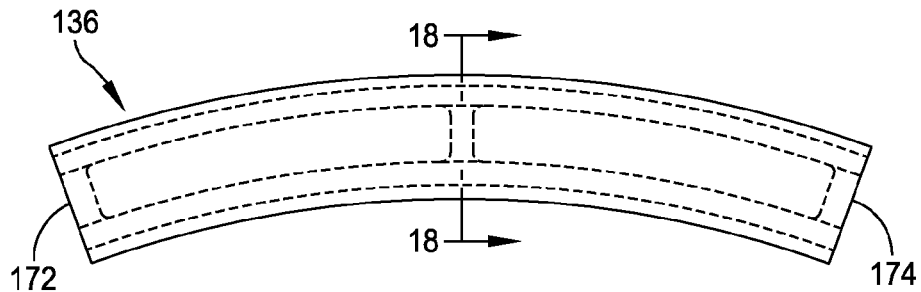
FIG. 17 is a front-side plan view of the gripping insert illustrated in FIG. 15.
Figure 18:
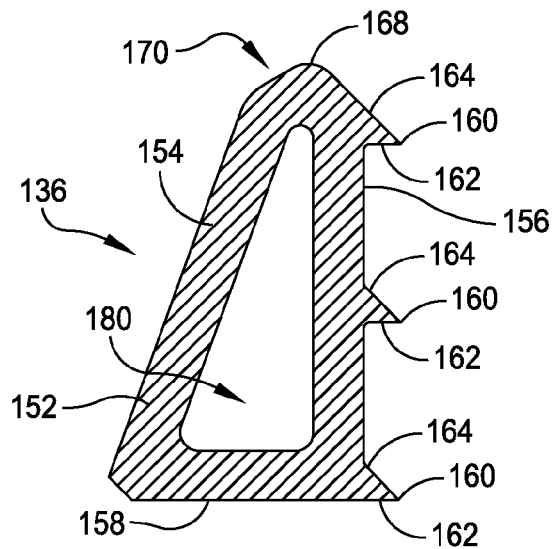
FIG. 18 is a cross-sectional view of the gripping insert taken along line 18-18 in FIG. 17.
Figure 19:
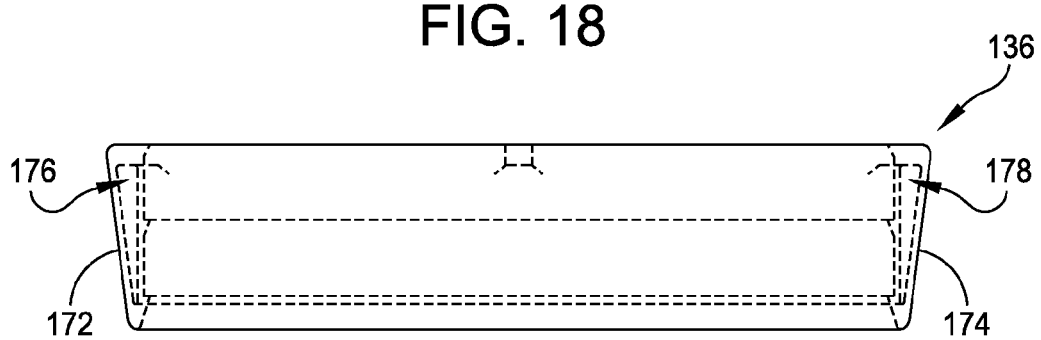
FIG. 19 is a top-side plan view of the gripping insert illustrated in FIG. 15.

FIGS. 15-20 provide various views of another example one of the plurality of gripping inserts 136. Referring first to FIGS. 15-17, gripping insert 136 includes a body 152 that curves along its length. The curvature of body 152 is complementary to the curvature of spigot end 12 of pipe 10. As best seen in FIG. 18, which is a sectional view of gripping insert 136 taken along line 18-18 in FIG. 17, body 152 has a triangular cross-sectional shape as defined by upper wall 154, lower wall 156, and rear wall 158. Lower wall 156 and rear wall 158 orthogonally extend from one another, and upper wall 154 extends from lower wall 156 at an angle that is complementary to the angle at which ridge angles away from the central axis, A, defined by bell 102 of pipe 100.

One or more teeth 160 extend from lower wall 156 and are configured to bite into the outer surface of male pipe 10 to prevent separate of pipe 10 and pipe 100 once pipes 10, 100 are engaged with one another. In some embodiments, such as the embodiment illustrated in FIGS. 15, 16, and 18, teeth 160 extend parallel to one another along the length of gripping insert 136. In some embodiments, teeth 160 have a different configuration such as, for example, an interrupted configuration in which teeth 160 do not extend the entire length of body 152 or have a non-parallel configuration.

Each tooth 160 includes a rear surface 162 that is orthogonal to lower wall 156 and a forward surface 164 that extends towards lower wall 156 at a non-orthogonal angle such that a point 166 is formed between rear surface 162 and forward surface 164. In some embodiments, the angle between rear surface 162 and forward surface 164 is 45 degrees; however, one of ordinary skill in the art will understand that the angle between rear surface 162 and forward surface 164 can be greater or less than 45 degrees. The length of rear surface 162, i.e., the height of a tooth 160, may be varied. In some embodiments, for example, the teeth 160 of a gripping insert 136 used with a high-density polyethylene ("HDPE") pipe is longer than the teeth 160 of a gripping insert 136 used with an IPS pipe.

In some embodiments, such as the embodiment illustrated in FIGS. 15, 16, and 18, the forward surface 164 of the foremost tooth 160 is extended to the foremost tip 168 of gripping insert 136 such that the leading end 170 of gripping insert 136 includes an angled surface. The angled surface of leading end 170 facilitates engagement of gasket assembly 132 and spigot end 12 of pipe 10 as described in greater detail below.

Figure 20:
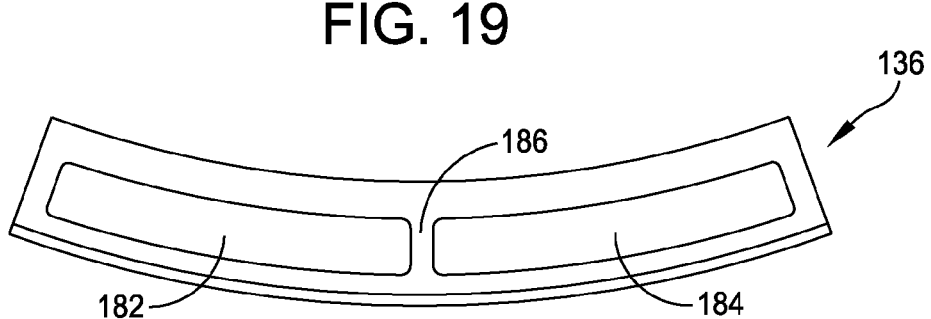
FIG. 20 is a rear-side plan view of the gripping insert illustrated in FIG. 15.

Gripping insert 136 is hollow with opposed sides 172, 174 defining respective openings 176, 178 that communicate with internal chamber 180. As best seen in FIG. 20, rear wall 158 defines a pair of adjacent windows 182, 184 each of which communicate with internal chamber 180. Disposed between adjacent windows 182, 184 is a reinforcing rib 186 that extends between upper wall 154 and lower wall 156. In some embodiments, gripping insert 136 includes more than two windows 182, 184 and a single reinforcing rib 186.

In some embodiments, gripping inserts 136 are formed from a rigid metal, such as steel, by an investment casting process. In some embodiments, gripping inserts 136 are formed from another material such as, for example, a plastic, such as an engineered plastic, or a ceramic material. Gripping inserts 136 are joined to gasket 134 by injection molding the gasket material into a mold in which gripping inserts 136 are disposed.

The hollow structure of gripping inserts 136 advantageously enables gripping inserts 136 to be integrally formed with gasket 134 without the use of primers or adhesives as the injection molded gasket material flows through openings 176, 178 and windows 182, 184 and within internal chamber 180 to secure gripping inserts 136 to gasket 134. The resultant structure of gasket assembly 132 prevents gasket 134 from blowing out when subjected to high pressures (e.g., pressures at or around 755 psi) when fully deflected. Additionally, the hollow design of gripping inserts 136 reduces the overall weight of gasket assembly 132.

Figure 21:
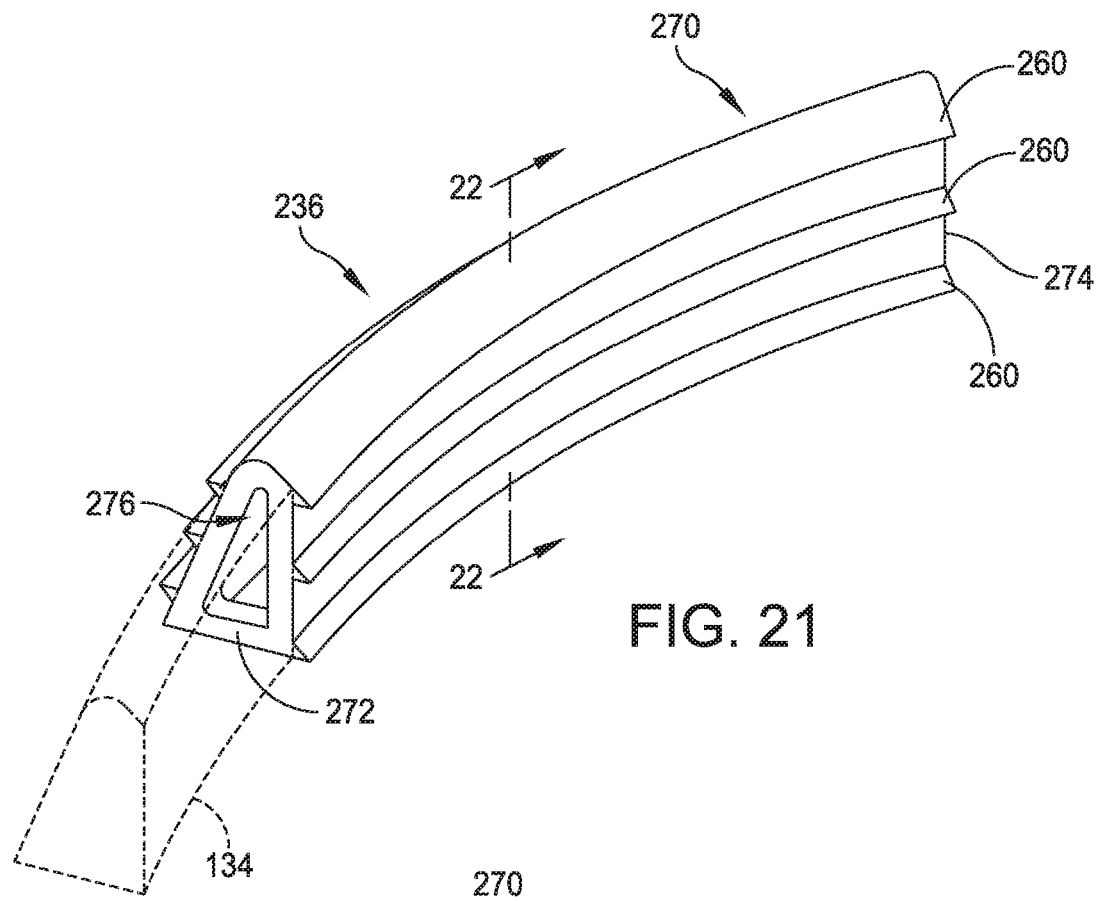
FIG. 21 is an isometric side view of another example of a gripping insert in accordance with some embodiments.
Figure 22:
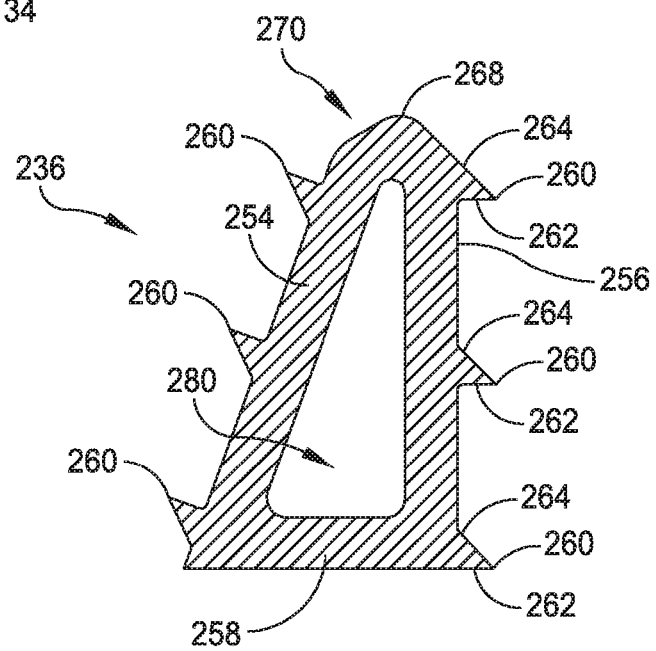
FIG. 22 is a cross-sectional view of the gripping insert illustrated in FIG. 21 taken along line 22-22 in FIG. 21.

Another embodiment of a gripping insert 236 is illustrated in FIGS. 21 and 22. As shown in FIGS. 21 and 22, gripping insert 236 includes teeth 260 extending from both the lower wall 256 and upper wall 254. Structural features of gripping insert 236 illustrated in FIGS. 21 and 22 that are similar or identical to structural features of gripping insert 136 illustrated in FIGS. 15-20 have the same reference numeral increased by 100. Descriptions of like features are not repeated. In some embodiments, gripping inserts 236 are used with conduits having bells, such as pipe bells or fitting bells, that are fabricated from PVC or other materials that is softer than a metal to provide enhanced gripping and prevent the gasket assembly from blowing out of its engagement with the bell.

Figure 23:
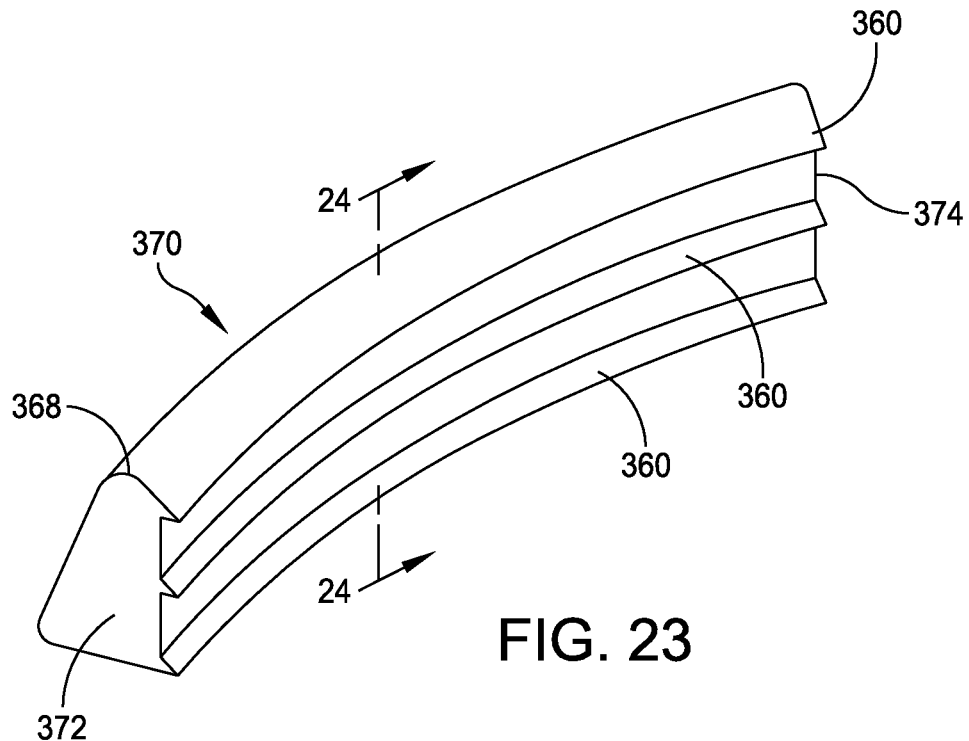
FIG. 23 is an isometric side view of another example of a gripping insert in accordance with some embodiments.
Figure 24:
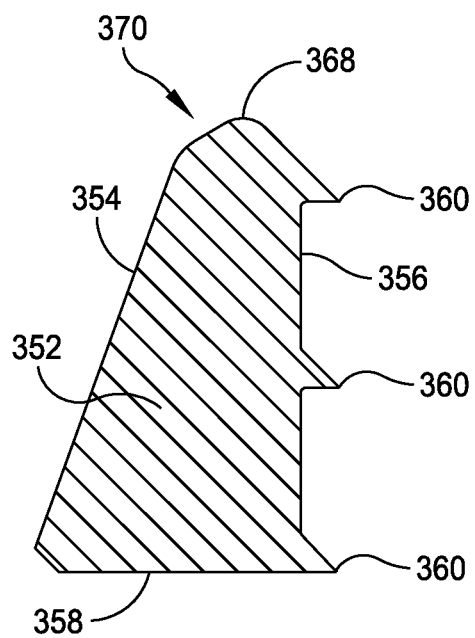
FIG. 24 is a cross-sectional view of the gripping insert illustrated in FIG. 23 taken along line 24-24 in FIG. 23.
Figure 25:
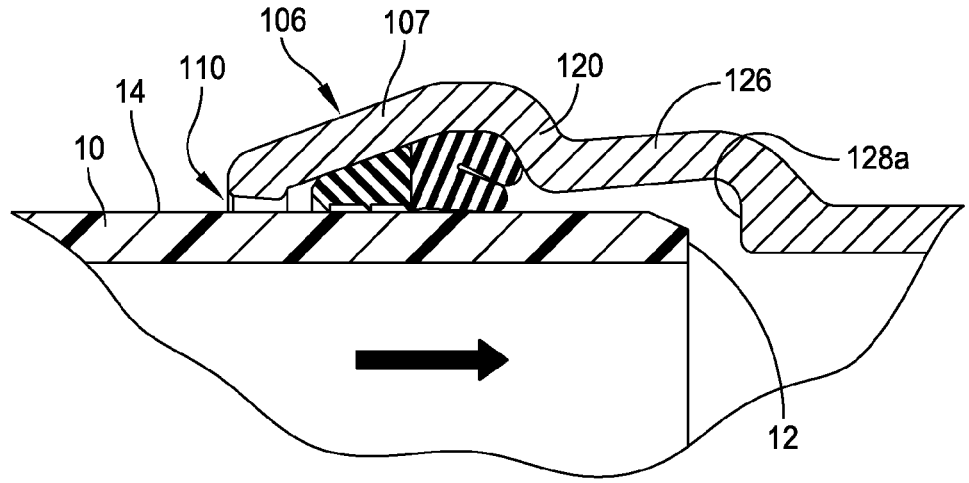
FIG. 25 is a cross-sectional view of one example of a pair of conduits being connected in accordance with some embodiments.

FIGS. 23 and 24 illustrate an embodiment in which gripping insert 336 has a solid-body construction. Again, the structural features of gripping insert 236 illustrated in FIGS. 16 and 17 that are similar or identical to structural features of gripping insert 136 illustrated in FIGS. 15-20 have the same reference numeral increased by 200. Descriptions of like features are not repeated. Gripping insert 336 is connected to gasket 134 by injection molding as described in U.S. Pat. No. 8,235,427 in the name of Jones et al., the entirety of which is herein incorporated by reference.

Once fabricated, gasket assembly 132 is installed within internal groove 116 defined by ridge 106 by compressing and inserting gasket assembly 132 into open end 108 of pipe 100. Gasket assembly 132 is inserted into conduit 100 until gasket assembly aligns with ridge 106 and is received within internal groove 116.

Figure 26:
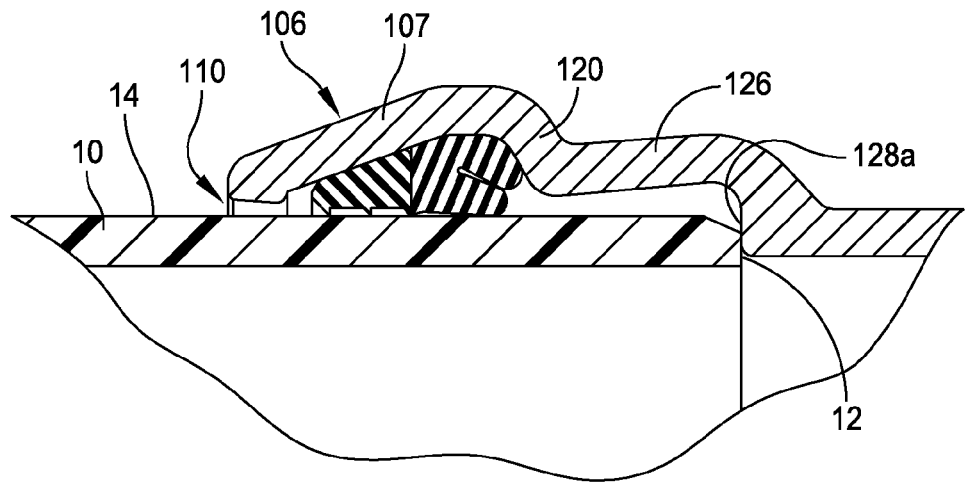
FIG. 26 is a cross-sectional view of one example of a first conduit being fully seated within a second conduit in accordance with some embodiments.

Conduit 10 is joined to conduit 100 by inserting spigot end 12 into open end 108 of conduit 100 until spigot end contacts leading end 170 of one or more gripping inserts 136 as illustrated in FIG. 20. Pressure continues to be applied to conduit 10 along the central axis, A, defined by conduit 100 causing gripping inserts 136 to be forced radially outward causing gasket 134 to radially expand such that conduit 10 is received within central aperture 186 defined by gasket 134. Conduit 10 continues to be advanced axially relative to pipe 100 until front face of spigot end 12 of conduit 10 contacts abutment end 128 of bell 102 as illustrated in FIG. 26.

Gasket assembly 132 slides along the outer surface 14 of pipe 10 as pipe 10 is advanced into bell 102. The relative movement between gasket assembly 132 and conduit 10 as conduit 10 is axially advanced into conduit 100 is facilitated by angled teeth 160 that enable conduit 10 to be received within central aperture 186 due to their angled geometry and by divergent legs 138, 140 contacting internal surface 126*a* of sloping portion 126 of ridge 106 that acts as a stop for gasket assembly 132. At this point, the joint between the conduits is actuated.

The joint between conduits 10 and 100 provided by the geometry of bell 102 and configuration of gasket assembly 132 enables conduit 10 to deflect up to and beyond five degrees relative to pipe 100 while at the same time preventing blow-outs while under high pressures. These advantages will be apparent as the operation of the joint is described with reference to FIGS. 26-28.

Gasket assembly 132 provides a liquid-tight seal between bell 102 of conduit 100 and spigot end 12 of conduit 10 when assembled regardless of whether a fluid, such as water, is flowing through conduits 10, 100 or only air is disposed within conduits 10, 100. The dimensions and configuration of internal groove 116 enable gasket assembly 132 to "float" depending on the amount of pressure to which conduits 10 and 100 are subjected unlike with conventional bell configurations. For example, gasket assembly 132 maintains conduits 10 and 100 at a first position in which gasket assembly 132 is approximately centered within internal groove 116 when the pressure within conduits 10 and 100 is a low or standard pressure, e.g., 70-150 psi, as illustrated in FIG. 26. As the pressure within conduits 10 and 100 increases, gasket 132 and bell 102 enable relative axial movement between conduits 10 and 100 as conduit 10 moves away from conduit 100.

Figure 27:
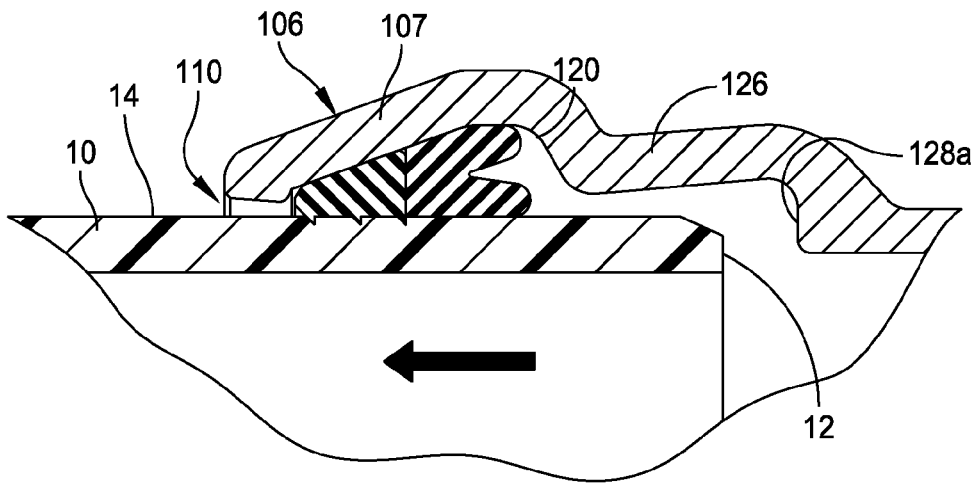
FIG. 27 is a cross-sectional view of one example of a pair of connected conduits under internal pressure in accordance with some embodiments.

The relative movement between conduit 10 and 100 is provided by gasket assembly being moved towards open end 108 of bell 102 resulting in upper surface 144 of gasket 132 and upper wall 154 of gripping inserts 136 to be forced into contact with internal surface 107*a* of forward portion 107 of ridge 106 as illustrated in FIG. 27. Teeth 160 of clamping inserts 136 are pressed into further engagement with the outer surface 14 of pipe 10 as the pressure builds within conduits 10 and 100 and upper surface 144 of gasket 132 and upper wall 154 of gripping inserts 136 are pressed against the internal surface 107a of forward portion 107 of ridge 106. The disclosed joint has been fabricated using PVC for conduits 10 and 100 and subjected to internal pressures up to and exceeding 755 psi without failing. Some conduits and gaskets in accordance with the present disclosure have been tested and have not failed when deflected and subjected to pressures of 850 psi.

Figure 28:
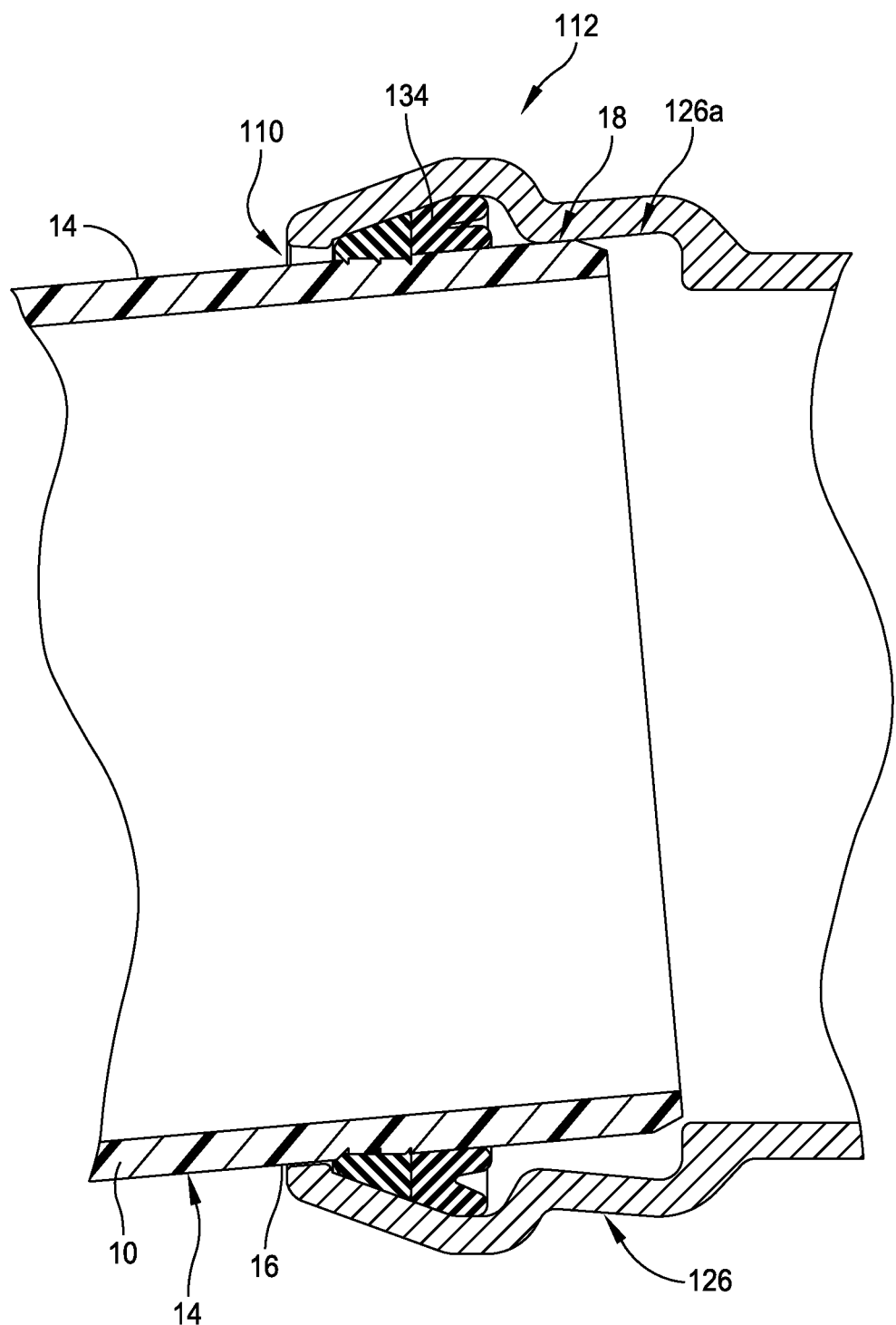
FIG. 28 is a cross-sectional view of one example of a pair of connected conduits with one conduit being deflected relative to the other conduit in accordance with some embodiments.

In addition to being able withstand high internal pressures when conduits 10 and 100 are linearly aligned with one another, bell 102 and gasket assembly 132 enable conduits 10 and 100 to withstand high internal pressures while being deflected up to five degrees relative to one another. FIG. 28 illustrates conduit 10 being deflected relative to conduit 100. As shown in FIG. 28, a first portion 16 of outer surface 14 of conduit 10 is in contact and flush with a portion of outer lip 110. Another portion 18 of outer surface 14 of conduit 10, which is disposed on the opposite side of conduit 10, is in contact with internal surface 126a of sloping portion 126 of bell 102. In this manner, the angle of outer lip 110 and angle of sloping portion 126 enable conduit 10 to be deflected relative to conduit 100.

Gasket assembly 132 maintains a fluid-tight seal even when conduit 10 is deflected relative to conduit 100. For example, the disclosed joint was fabricated using PVC for conduits 10 and 100 as described above and was tested under a high-pressure while one conduit was deflected by more than five degrees relative to the other conduit. The conduit was subjected to an internal pressure of 760 psi for more than five minutes while deflected and did not fail.

As described above, the disclosed conduit connecting system advantageously enables deflection between two conduits of up to and beyond five degrees in a single direction and ten degrees in multiple directions. Furthermore, the system can be used with conduits fabricated from PVC, HDPE, and ductile iron thereby enabling conduits to be used in coastal areas, areas susceptible to frequent and extreme seismic activity, and areas susceptible to significant expansion and contraction with less likelihood of failure. Additionally, the disclosed conduit system can be utilized in horizontal direction drilling operations as the joint is actuated upon engagement of the gasket assembly on an inner conduit and does not rely on the presence of an elevated (i.e., greater than atmospheric) internal pressure.

These advantages are attributable to the coupling between the elastomeric gasket and the gripping inserts or segments. The angling of the segments enables a pipe spigot to be inserted into the bell and automatically engage. The engagement is strong such that the pipe or fitting cannot be easily separated. When pressure is added, the fluid activates the gasket by pushing the gasket into the annular groove and increase the securement of the restraint mechanism. Additionally, the gasket is configured to engage without internal pressure or in a dry application. In some embodiments, teeth on the gripping segments engage the mating pipe both on the inner diameter and on the outer diameter of the pipe or bell.

Although the system and method have been described in terms of exemplary embodiments, they are not limited thereto. Rather, the appended claims should be construed broadly, to include other variants and embodiments of the system and method, which may be made by those skilled in the art without departing from the scope and range of equivalents of the system and method.

What is claimed is:

1. A system, comprising:
   a conduit comprising a body and a bell defining an opening disposed at one end of the conduit, the bell including
   a ridge defining a circumferential internal groove,
   a sloping portion defining an internal recessed area and disposed adjacent to the ridge, wherein a valley is disposed between the ridge and the sloping portion, the valley having a diameter that is smaller than an internal diameters of the ridge and the sloping portion, and
   an abutment end inwardly extending from the sloping portion in a direction that is perpendicular to a central axis defined by the bell; and
   a gasket assembly disposed within the internal groove, the gasket assembly including
   a plurality of gripping inserts each comprising a hollow body, and
   an elastomeric gasket having a circular shape and being disposed within the hollow bodies defined by the plurality of gripping inserts.

2. The system of claim 1, wherein the bell includes a tapered outer lip that inwardly extends from an outer edge to an inner edge.

3. The system of claim 2, wherein an angle between the tapered outer lip and the central axis defined by the bell is five degrees.

4. The system of claim 1, wherein the sloping portion outwardly extends from the valley at an angle of five degrees with respect to the central axis defined by the bell.

5. The system of claim 1, wherein each gripping insert includes a plurality of teeth outwardly extending from a lower wall that extends in a lengthwise direction.

6. The system of claim 5, wherein each gripping insert includes a rear wall and an upper wall extending from the lower wall and defining an internal chamber.

7. The system of claim 6, wherein the rear wall defines at least one window in communication with the internal chamber, the at least one window receiving at least portion of the gasket therethrough.

8. The system of claim 6, wherein each gripping insert includes a pair of opposed ends each defining a respective opening in which at least a portion of the gasket is received.

9. A system, comprising:
   a conduit comprising a body and a bell defining an opening disposed at one end of the conduit, the bell including
   a ridge defining a circumferential internal groove,
   a sloping portion defining an internal recessed area and disposed adjacent to the ridge, wherein a valley is disposed between the ridge and the sloping portion, the valley having a diameter that is smaller than an internal diameters of the ridge and the sloping portion, and
   an abutment end inwardly extending from the sloping portion in a direction that is perpendicular to a central axis defined by the bell; and
   a gasket assembly sized and configured to be received within the internal groove defined by the bell of the pipe, the gasket assembly including
   a plurality of gripping inserts each comprising a hollow body, and
   an elastomeric gasket having a circular shape and being disposed within the hollow bodies defined by the plurality of gripping inserts.

10. The system of claim 9, wherein the bell includes a tapered outer lip that inwardly extends from an outer edge to an inner edge.

11. The system of claim 10, wherein an angle between the tapered outer lip and the central axis defined by the bell is five degrees.

12. The system of claim 9, wherein the sloping portion outwardly extends from the valley at an angle of five degrees with respect to the central axis defined by the bell.

13. The system of claim 9, wherein each gripping insert includes a plurality of teeth outwardly extending from a lower wall that extends in a lengthwise direction.

14. The system of claim 13, wherein each gripping insert includes a rear wall and an upper wall extending from the lower wall and defining an internal chamber.

15. The system of claim 14, wherein the rear wall defines at least one window in communication with internal chamber, the at least one window receiving at least portion of the gasket therethrough.

16. The system of claim 14, wherein each gripping insert includes a pair of opposed ends each defining a respective opening in which at least a portion of the gasket is received.

17. A system, comprising:
a conduit comprising a body and a bell defining an opening disposed at one end of the conduit, the bell including
a ridge defining a circumferential internal groove,
a sloping portion defining an internal recessed area and disposed adjacent to the ridge, and
an abutment end inwardly extending from the sloping portion in a direction that is perpendicular to a central axis defined by the bell; and
a gasket assembly disposed within the internal groove, the gasket assembly including
a plurality of gripping inserts each comprising a hollow body, a plurality of teeth outwardly extending from a lower wall that extends in a lengthwise direction, a rear wall, and an upper wall extending from the lower wall and defining an internal chamber, and
an elastomeric gasket having a circular shape and being disposed within the hollow bodies defined by the plurality of gripping inserts, wherein the rear wall of the plurality of gripping inserts defines at least one window in communication with the internal chamber, the at least one window receiving at least a portion of the gasket therethrough.

18. The system of claim 17, wherein the bell includes a tapered outer lip that inwardly extends from an outer edge to an inner edge.

19. A system, comprising:
a conduit comprising a body and a bell defining an opening disposed at one end of the conduit, the bell including
a ridge defining a circumferential internal groove,
a sloping portion defining an internal recessed area and disposed adjacent to the ridge, and
an abutment end inwardly extending from the sloping portion in a direction that is perpendicular to a central axis defined by the bell; and
a gasket assembly sized and configured to be received within the internal groove defined by the bell of the pipe, the gasket assembly including
a plurality of gripping inserts each comprising a hollow body, wherein each gripping insert includes a plurality of teeth outwardly extending from a lower wall that extends in a lengthwise direction, and
an elastomeric gasket having a circular shape and being disposed within the hollow bodies defined by the plurality of gripping inserts.

20. The system of claim 19, wherein the bell includes a tapered outer lip that inwardly extends from an outer edge to an inner edge.

* * * * *